(12) United States Patent
Latif

(10) Patent No.: US 10,234,012 B1
(45) Date of Patent: Mar. 19, 2019

(54) SYSTEMS AND METHODS FOR ACTIVELY MONITORING HEALTH OF A NO BACK BRAKE DEVICE

(71) Applicant: Rana Kamran Latif, Corona, CA (US)

(72) Inventor: Rana Kamran Latif, Corona, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 876 days.

(21) Appl. No.: 14/788,678

(22) Filed: Jun. 30, 2015

(51) Int. Cl.
| | |
|---|---|
| B64C 13/28 | (2006.01) |
| F16H 25/20 | (2006.01) |
| F16H 25/22 | (2006.01) |
| F16H 25/24 | (2006.01) |
| F16H 57/01 | (2012.01) |
| G05B 15/02 | (2006.01) |

(52) U.S. Cl.
CPC ............ *F16H 57/01* (2013.01); *B64C 13/28* (2013.01); *F16H 25/2204* (2013.01); *F16H 25/2454* (2013.01); *G05B 15/02* (2013.01); *F16H 2025/2075* (2013.01); *F16H 2057/016* (2013.01)

(58) Field of Classification Search
CPC ................................ B64C 13/24; G01L 13/02
USPC .................................................. 74/89; 73/716
See application file for complete search history.

(56) References Cited

U.S. PATENT DOCUMENTS

| | | | |
|---|---|---|---|
| 5,582,390 A | 12/1996 | Russ | |
| 7,293,524 B2 | 11/2007 | Darby | |
| 8,291,782 B1 | 10/2012 | Shaheen et al. | |
| 8,918,291 B2 | 12/2014 | Tallot et al. | |
| 2004/0187556 A1* | 9/2004 | Abe | G01N 19/02 73/9 |
| 2011/0048147 A1* | 3/2011 | Keech | B64C 5/02 74/89.26 |
| 2011/0127375 A1* | 6/2011 | Tallot | B64C 5/10 244/99.9 |

FOREIGN PATENT DOCUMENTS

| | | |
|---|---|---|
| EP | 0 960 811 | 12/1999 |
| EP | 0 983 937 | 3/2000 |
| EP | 1 245 867 | 10/2002 |

OTHER PUBLICATIONS

Bahrami, A., Airworthiness Directives; Bombardier, Inc. Model BD-100-1A10 (Challenger 300) Airplanes, Department of Transportation, Federal Aviation Administration, Federal Register, vol. 77, No. 66, Apr. 5, 2012, 3 pages.

* cited by examiner

*Primary Examiner* — Sheng-Bai Zhu
(74) *Attorney, Agent, or Firm* — Donna P. Suchy; Daniel M. Barbieri

(57) ABSTRACT

An actuator system includes a motor, a ballscrew assembly coupled to the motor, a no back brake device coupled to the ballscrew assembly, and a sensor coupled to the ballscrew assembly. The sensor is configured to acquire load data regarding a load applied to the no back brake device. A control module is configured to determine an estimated coefficient of friction for the no back brake device based on the load data, and transmit an alert signal based on determining that the estimated coefficient of friction is outside a predetermined range. The control module is coupled with the sensor and includes a processor coupled with a non-transitory processor-readable medium storing processor executable code.

20 Claims, 4 Drawing Sheets

SYSTEMS AND METHODS FOR ACTIVELY MONITORING HEALTH OF A NO BACK BRAKE DEVICE

BACKGROUND

The inventive concepts disclosed herein relate generally to actuator systems, and more specifically, to systems and methods for actively monitoring the health of a no back brake device for a stabilizer actuator system.

Actuator systems such as horizontal stabilizer trim actuators may use no back brake devices to avoid unwanted movement of the actuator. In some systems, ballscrew assemblies are employed where a horizontal stabilizer is coupled to a ball nut on the ballscrew. The no back brake device avoids undesirable movement of the horizontal stabilizer by resisting movement of the ballscrew upon which the ball nut, and in turn the horizontal stabilizer, move.

Aircraft typically utilize horizontal stabilizers that pivot relative to the fuselage of the aircraft. The horizontal stabilizer is adjusted, or trimmed, by way of an actuator. Some actuators include a ballscrew that extends from a primary gimbal on the aircraft fuselage to a ball nut coupled to the horizontal stabilizer. Rotation of the ballscrew causes a corresponding upward or downward movement of the ball nut along the ballscrew, thereby enabling upward and downward adjustment of the horizontal stabilizer. The ballscrew is typically rotated by way of a motor (e.g., an electric or hydraulic motor), which may be used to position the horizontal stabilizer in a desired position during take-off, cruising, landing, etc.

During flight, aerodynamic loads act upon the horizontal stabilizer, and these loads are transmitted to the ballscrew assembly. To avoid undesirable movement of the ballscrew, a brake device, referred herein to as a "no back brake" device, is used. A typical no back brake device resists movement of the ballscrew assembly arising from aerodynamic loads in both an upward and downward direction.

SUMMARY

In one aspect, embodiments of the inventive concepts disclosed herein are directed to an actuator system. The actuator system includes a motor, a ballscrew assembly coupled to the motor, a no back brake device coupled to the ballscrew assembly, and a sensor coupled to the ballscrew assembly. The sensor is configured to acquire load data indicative of a load applied to the no back brake device. A control module is configured to determine an estimated coefficient of friction for the no back brake device based on the load data, and transmit an alert signal based on determining that the estimated coefficient of friction is outside of a predetermined range. The control module is coupled with the sensor and includes a processor coupled with a non-transitory processor-readable medium storing processor executable code.

In a further aspect, embodiments of the inventive concepts disclosed herein are directed to a control system configured to monitor a condition of a no back brake device. The control system includes a control module configured to receive load data from a sensor indicative of an external load applied to a ballscrew assembly coupled to a no back brake device. The control module receives motor data regarding a motor coupled to the ballscrew assembly, and determines a coefficient of friction for the no back brake device based on the load data and the motor data. The control module transmits an alert signal based on determining that the coefficient of friction is outside a predetermined range. The control module includes a processor coupled with a non-transitory processor-readable medium storing processor executable code.

In a further aspect, embodiments of the inventive concepts disclosed herein are directed to a method of monitoring a no back brake device for a ballscrew assembly. The method includes receiving load data from a sensor indicative of an external load applied to a ballscrew assembly coupled to a no back brake device, and receiving motor data regarding a motor coupled to the ballscrew assembly. The method further includes determining a coefficient of friction for the no back brake device based on the load data and the motor data, and transmitting an alert signal based on determining that the coefficient of friction is outside of an acceptable range.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
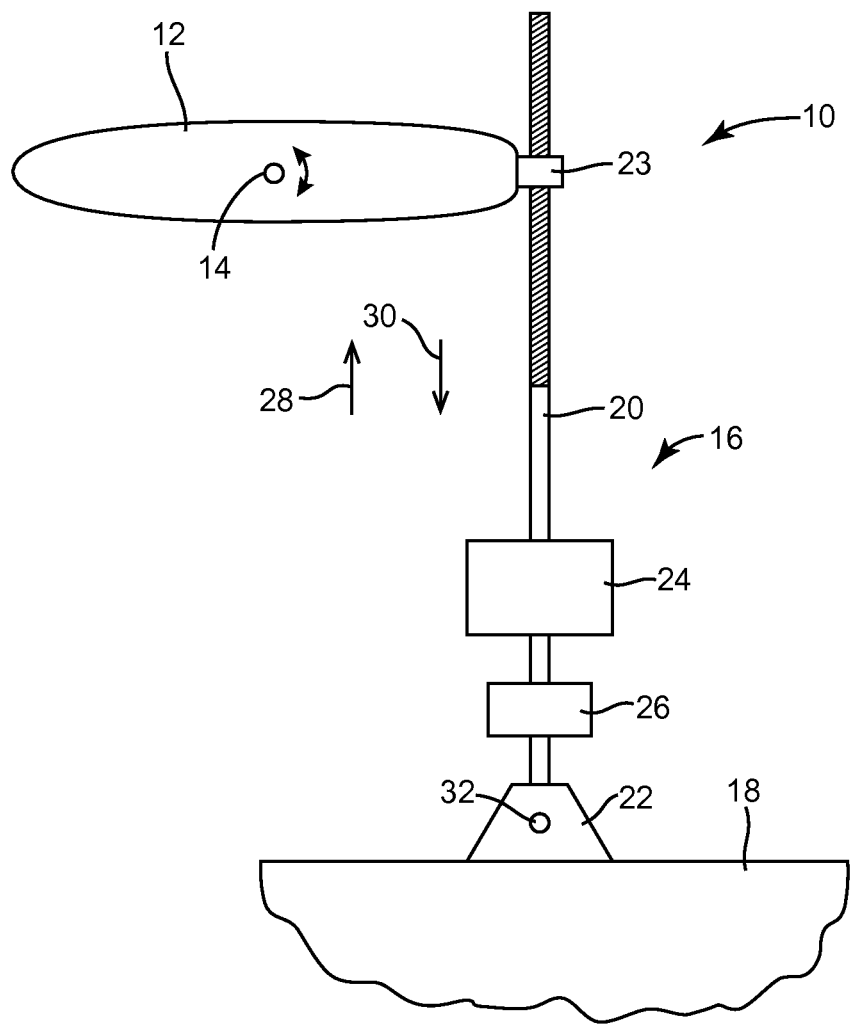
FIG. 1 is a schematic representation of an actuator system coupled to a horizontal stabilizer according to one embodiment of the inventive concepts disclosed herein.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the broad scope of the inventive concepts disclosed herein.

Referring to the Figures generally, various embodiments disclosed herein relate to monitoring no back brake devices, and more specifically, monitoring no back brake devices used with ballscrew assemblies and horizontal stabilizers on aircraft.

Actively monitoring the health of no back brake devices may provide warnings to pilots or other personnel and facilitate taking necessary corrective action in the event of a failure of the no back brake device. As such, various embodiments disclosed herein relate to actively monitoring the status or health of a no back brake device (e.g., during flight).

In general, a sensor acquires load data regarding external loads on the ballscrew. A motor torque (for either an electric motor or hydraulic motor) is determined based on motor data (e.g., motor current, pressure differential). Based on this data, a coefficient of friction for the no back brake device is estimated. The estimated coefficient of friction is compared to an acceptable range (e.g., one or more predetermined thresholds). An estimated coefficient that is, for example, below a minimum threshold value may indicate a failure in the no back brake device. Based on the comparison, corrective action may be taken as needed, including transmitting an alert signal, actuating a secondary brake system, etc. Further details regarding monitoring a no back brake device are provided below in connection with the Figures.

Referring now to FIG. 1, a stabilizer system 10 is shown according to one embodiment. As shown in FIG. 1, the stabilizer system 10 may be a horizontal stabilizer system for use in an aircraft. In other embodiments, the stabilizer system 10 may have other applications.

In one embodiment, the stabilizer system 10 includes a stabilizer 12 (e.g., a horizontal stabilizer) which rotates about a pivot 14. The stabilizer 12 is coupled to a fuselage 18 via actuator 16. The actuator 16 includes a ballscrew 20, which is coupled to the fuselage 18 via a primary gimbal 22, and coupled to the stabilizer 12 via a ball nut 23. A motor 24 and the no back brake device 26 are coupled to the ballscrew 20. As discussed in greater detail below, the motor 24 acts to rotate the ballscrew 20, causing the ball nut 23 to translate along the ballscrew 20, and in turn causing the stabilizer 12 to rotate about the pivot 14 in a direction dependent on the direction of rotation of the ballscrew 20. The no back brake device 26 acts to resist undesired movement of the ballscrew 20 resulting from aerodynamic forces acting upon the stabilizer 12 or other components of the system 10.

The motor 24 is in one embodiment an electric motor configured to operate based on a motor current and rotate the ballscrew 20 with an appropriate gear ratio, thereby providing a desired adjustment of the stabilizer 12. In an alternative embodiment, the motor 24 is a hydraulic motor and may be coupled to the ballscrew 20 via a differential with an appropriate gear ratio. The hydraulic motor may utilize a pressure differential and have a volumetric displacement. In further embodiments, other types of motors 24 may be utilized in connection with the system 10.

Figure 2:
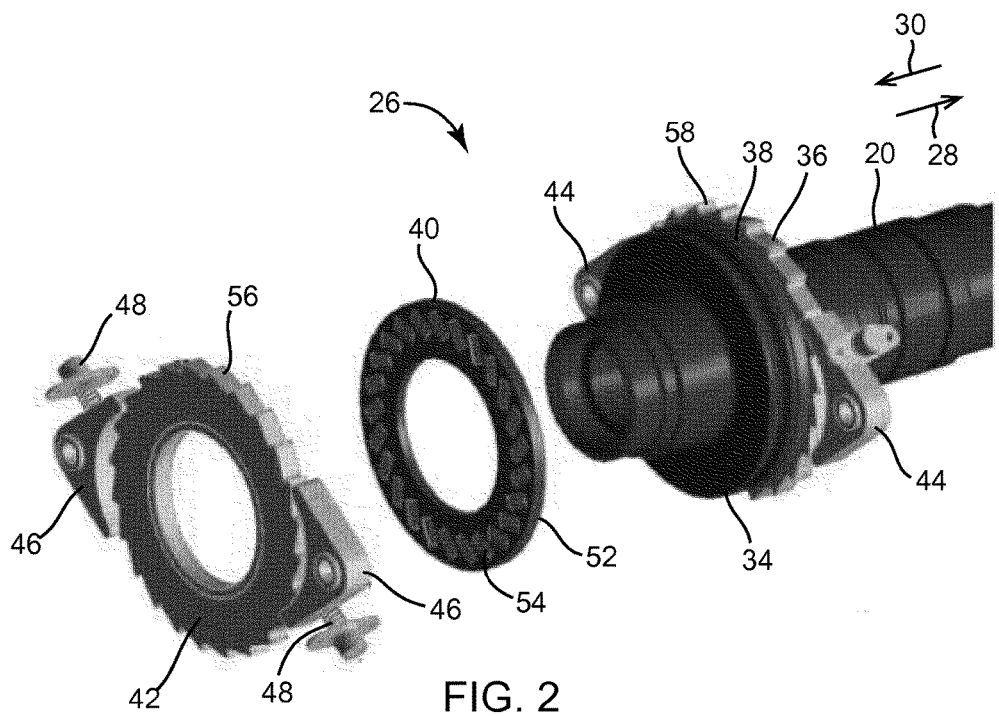
FIG. 2 is a partially exploded perspective view of a no back brake device for the actuator system of FIG. 1 according to one embodiment of the inventive concepts disclosed herein.
Figure 3:
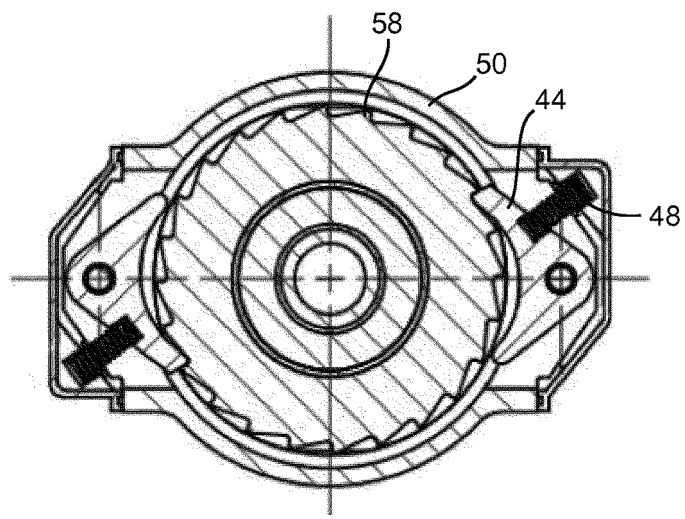
FIG. 3 is a cross-sectional view of the no back brake device of FIG. 2.

Referring to FIGS. 2-3, the no bake brake device 26 is shown in greater detail according to one embodiment. The ballscrew 20 includes a flange 34 axially and rotationally fixed relative to the shaft of the ballscrew 20. The no back brake device 26 includes a first, or upper ratchet plate 36, and a first, or upper disc 38 positioned to a first, or upper side of the flange 34. The no back brake device 26 further includes a second, or lower disc 40 and a second, or lower ratchet plate 42, positioned to a second, or lower side of the flange 34. The upper and lower ratchet plates 36 and 42, and the upper and lower discs 38, 42, are provided at least partially within a housing 50. Pawls 44, 46 are disposed within the housing 50 and engage the upper and lower ratchet plates 36, 42, respectively. Springs 48 bias the pawls 44, 46 toward the upper and lower ratchet plates 36, 42. The lower disc 40 includes a cage 52 and a number of skewed rollers 54. The upper disc 38 may be of similar construction.

In one embodiment, the upper ratchet plate 36 includes teeth 58 that are skewed in a first direction such that the pawls 44 resist movement of the upper ratchet plate 36 in the first direction. Upon a load (e.g., an upward load in a direction 28 shown in FIG. 2) being applied to the ballscrew 20, the flange 34 tends to force upper disc 38 toward the upper ratchet plate 36, and the frictional forces between the opposing surfaces of the flange 34, the upper disc 38, and the upper ratchet plate 36 tend to resist relative movement between the flange 34, the upper disc 38, and the upper ratchet plate 36. Thus, due to the engagement of the teeth 58 of the upper ratchet plate 36 with the pawls 44, the upper ratchet plate 36 and the ballscrew 20 tend to remain in position in absence of application of a torque (e.g., a motor torque) sufficient to overcome the frictional forces between components of the no back brake device 26.

Similarly, the lower ratchet plate 42 includes teeth 56 that are skewed in a second direction such that the pawls 46 resist movement of the lower ratchet plate 42 in the second direction (opposite the first direction discussed above). Upon a load (e.g., a downward load in a direction 30 shown in FIG. 2) being applied to the ballscrew 20, the flange 34 tends to force the lower disc 38 toward the lower ratchet plate 42, and the frictional forces between the opposing surfaces of the flange 34, the lower disc 40, and the lower ratchet plate 42 tend to resist relative movement between the flange 34, the lower disc 40, and the lower ratchet plate 42. Thus, due to the engagement of the teeth 56 of the lower ratchet plate 42 with the pawls 46, the lower ratchet plate 42 and the ballscrew 20 tend to remain in position in absence of application of a torque (e.g., a motor torque) sufficient to overcome the frictional forces between components of the no back brake device 26.

Figure 4:
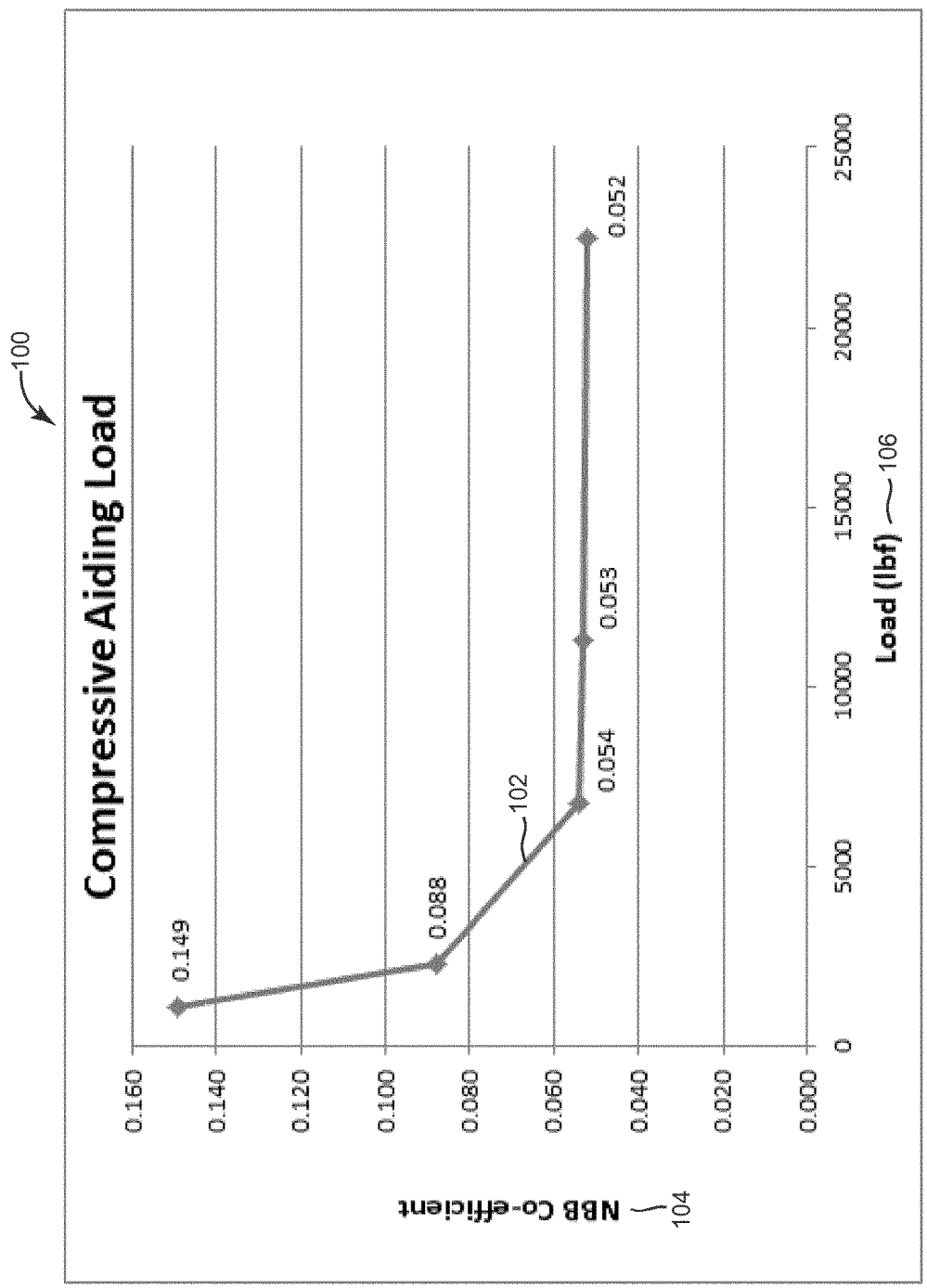
FIG. 4 is a graph showing the coefficient of friction of a no back brake device as a function of a compressive aiding load on the no back brake device.

In one embodiment, based on the nature of the no back brake design, braking friction is increased as the applied load increases. Referring to FIG. 4, at relatively higher loads, line 102 on graph 100 illustrates that the coefficient of friction 104 of the no back brake device 26 can be estimated with greater accuracy as a function of an aiding load 106. In one embodiment, an aiding load condition is defined as when the applied load and translation of the ballnut are in the same direction. By estimating the coefficient of friction of the no back brake device 26 during use and under relatively high loads, failures of the no back brake device 26 can be detected by determining when the calculated or estimated coefficient of friction of the no back brake device 26 falls outside of an acceptable range. For example, during design of the no back brake device 26, a coefficient of friction for a particular system may be chosen to be within a range of 0.04 to 0.09. A control module (e.g., implemented with a flight computer) may store this range. If, during operation or flight, the estimated coefficient of friction for the no back brake device 26 falls outside (typically below) this range an alert signal can be generated and/or secondary brake systems can be engaged to prevent system runaway.

In one embodiment, the coefficient of friction (COF) of the no back brake device is estimated based on various known and/or measured parameters relating to the no back brake system. For example, motor torque can be determined as a function of either current (in the case of electric motors) or a pressure difference $\Delta P$ (in the case of hydraulic motors). As shown below, TORQUE(electric motor)=CURRENT*$K_t$, TORQUE(hydraulic motor)=VOLUMETRIC DISPLACEMENT*$\Delta P$;

where $K_t$ is a known design parameter of an electric motor, and where volumetric displacement is a known design parameter of a hydraulic motor. In both electric and hydraulic motor systems, a differential gear system may be utilized along with a gear train, such that the torque transmitted to the ballscrew is further dependent upon the gear ratio of the gear train used. In other systems, the motor torque may be transmitted directly to the ballscrew without the need to factor in any gear ratio. As such, for both electric and hydraulic motors, the torque transmitted to the ballscrew ($T_{BS}$) may be determined as a function of current (in the case of electric motors) or pressure difference (in the case of hydraulic motors). As shown below:

$$T_{BS} = \text{TORQUE(motor)} * \text{GEAR RATIO}$$

The ballscrew also experiences a torque ($T_{EXT}$) due to external loads (e.g., aerodynamic loads). In one embodiment, this may be approximated as follows:

$$T_{EXT} = (\text{LOAD} * \text{LEAD})/2\pi * \text{EFFICIENCY}$$

In the above equation, LOAD is the external load on the ballscrew (e.g., measured by one or more load sensors), LEAD is a design parameter of the ballscrew, and EFFICIENCY is the ballscrew efficiency. The feedback torque ($T_{FB}$) of the no back brake device may be approximated as follows:

$$T_{FB} = T_{BS} + T_{EXT}$$

To estimate the coefficient of friction (COF) of the no back brake device, the following equation may in some embodiments be used:

$$\text{COF} = T_{FB}/(R_M * \text{LOAD});$$

where $R_M$ is a design parameter representing the mean radius of the no back brake device. As such, based on measuring the external load on the no back brake device and certain motor inputs (e.g., current or pressure), the coefficient of friction may be estimated.

Figure 5:
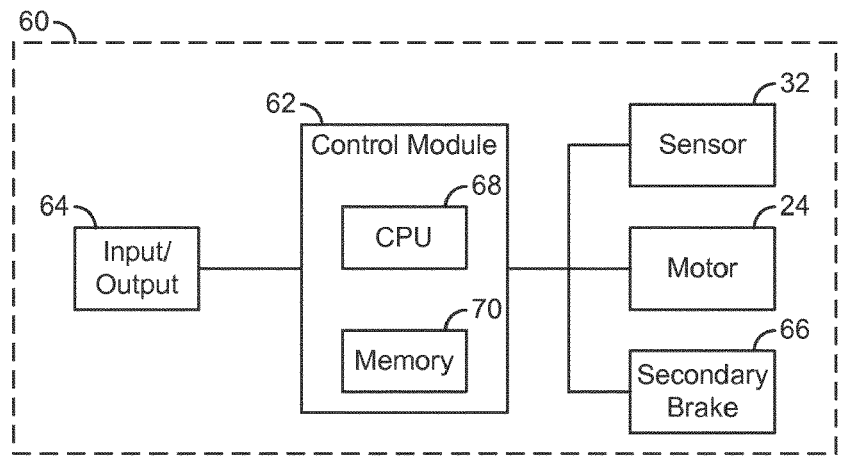
FIG. 5 is a block diagram of a control system for the actuator system of FIG. 1 according to one embodiment of the inventive concepts disclosed herein.

Referring now to FIG. 5, a control system 60 for monitoring a no back brake system is shown according to an exemplary embodiment. The system 60 includes input/output device 64 communicatively coupled to a control module 62. The control module 62 is in turn communicatively couple to the sensor 32, the motor 24, and a secondary brake 66. In one embodiment, the sensor 32 is or includes a load pin configured to acquire load data regarding a load applied to the ballscrew 20. In other embodiments, the sensor 32 may be or include other devices, such as strain gauges, etc. More or fewer components may form the system 60 according to various embodiments.

The input/output device 64 is configured to provide inputs to and receive outputs from the control module 62. For example, the input/output device 64 may be or include a pilot control device, an auto-pilot system, and the like, such that the input/output device 64 can provide control signals to the control module 62 to control the position of the stabilizer 12 (e.g., by control of the motor 24).

The control module 62 is configured to control operation of various components of stabilizer system 10, and in one embodiment includes a processor 68 and a memory 70. The processor 68 may be implemented as an application specific integrated circuit (ASIC), one or more field programmable gate arrays (FPGAs), a digital-signal-processor (DSP), a group of processing components, or other suitable electronic processing components. The memory 70 is one or more devices (e.g., RAM, ROM, Flash Memory, hard disk storage, etc.) for storing data and/or computer code for facilitating the various processes described herein. The memory 70 may be or include a non-transitory processor-readable medium storing processor executable code and/or data. The memory 70 may include database components, object code components, script components, or any other type of information structure for supporting the various activities and information structures described herein. The memory 70 may be communicably connected to the processor 68 and provide computer code or instructions to the processor 68 for executing the processes described herein.

The control module 62 is in one embodiment configured to monitor the no back brake device 26 health by determining, or calculating, an estimated coefficient of friction for the no back brake device 26, and determining whether the estimated coefficient of friction is within an acceptable range (e.g., above a minimum threshold, below a maximum threshold, between minimum and maximum thresholds). As noted above, the coefficient of friction may be calculated based on various load and motor data. As such, the control module 62 receives load data from the sensor 32 and motor data from the motor 24. Load data may include data regarding forces and/or torques applied to the ballscrew 20 via external (e.g., aerodynamic) loads on the stabilizer 12. Motor data may include various operating parameters regarding the motor 24. For example, in the case of an electric motor, motor data may include a motor current. In the case of a hydraulic motor, motor data may include a pressure differential.

Based on the estimated coefficient of friction for the no back brake device 26 and a predetermined acceptable range (e.g., defined by one or more predefined thresholds), the control module 62 can predict whether a failure exists in the no back brake device 26 (e.g., by identifying an abnormally low estimated coefficient of friction) and take appropriate corrective action. Corrective action my include transmitting an alert signal to a pilot or flight computer, actuating a secondary brake, or other action.

Figure 6:
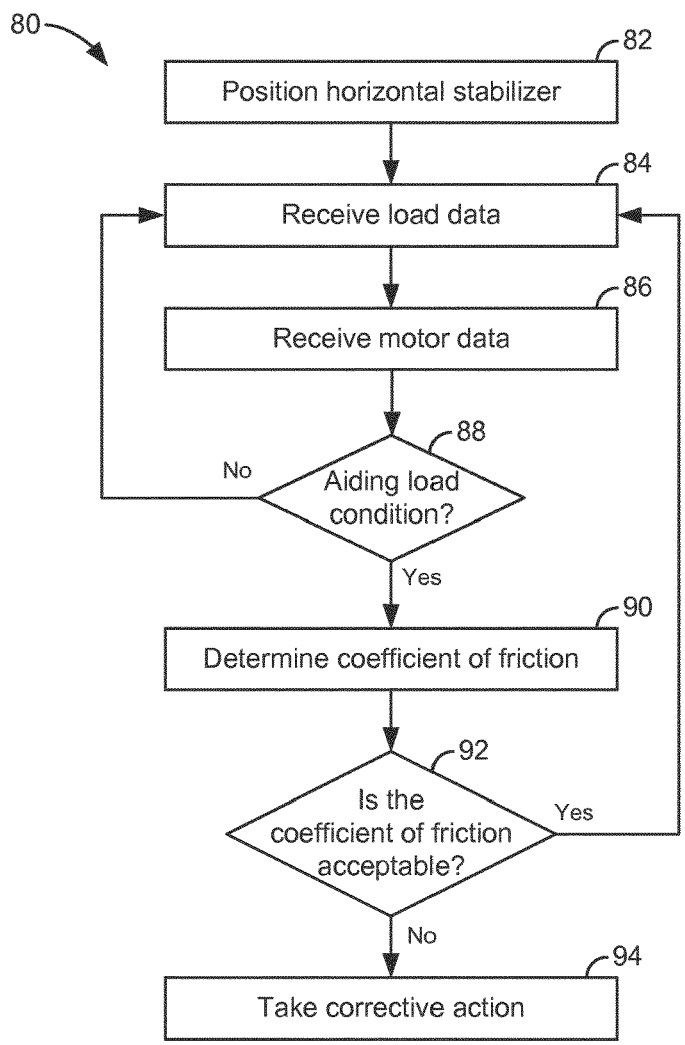
FIG. 6 is a flow chart illustrating a method of monitoring a no back brake device for an actuator system according to one embodiment of the inventive concepts disclosed herein.

Referring now to FIG. 6, a method 80 of monitoring the health of a no back brake device for a stabilizer system is shown according to one embodiment. At 82, the stabilizer is moved to a desired position, for example, by actuating a motor to rotate a ballscrew coupled to the stabilizer. At 84, load data is received regarding an external load applied to the ballscrew. In one embodiment, a load sensor provides load data to a control module. At 86, motor data is received regarding one or more operational parameters of a motor such as motor 24. In various embodiments, the motor may be an electric motor, hydraulic motor, or other type of motor, and the motor data may include a motor current, a motor pressure, etc. Other design parameters of the motor may be stored in memory and accessed as needed. At 88, it is determined whether an aiding load condition exists. If an aiding load condition does not exist, the method continues at step 84. If an aiding load condition exists, then at 90, an estimated coefficient of friction for the no back brake device is determined based on the load data and the motor data. At 92, a determination is made as to whether the estimated coefficient of friction for the no back brake device is an acceptable value. In one embodiment, the estimated coefficient of friction for the no back brake device is compared to an acceptable range. If the coefficient of friction for the no back brake device is within an acceptable range, the method continues at step 84. At 94, if the coefficient of friction of the no back brake device is not within an acceptable range, corrective action is taken. In various alternative embodiments, corrective action may include transmitting an alert signal, actuating a secondary brake of the stabilizer system, or similar actions.

The systems and methods of actively monitoring health of a no back brake device disclosed herein can be implemented with electric as well as hydraulic trim actuators to detect degradation of the no back brake device braking capability (e.g., dormant failure of the no back brake device). Further, the systems and methods disclosed herein may reduce or eliminate the need for maintenance intervals for the no back brake device health check and any special ground support equipment (e.g., to provide an external load). In addition, hydraulic trim actuators currently typically use a dual load path gear train due to potential no back brake failures being dormant, and with active monitoring of the no back brake device, design and certification of single load path gear trains may be possible since no back brake failure will not be dormant.

The inventive concepts disclosed herein contemplate methods, systems, and program products on any machine-readable media for accomplishing various operations. Embodiments of the inventive concepts disclosed herein may be implemented using a special purpose computer processor for an appropriate system, incorporated for this or another purpose, or by a hardwired system. Embodiments of the inventive concepts disclosed herein include program products comprising machine-readable media for carrying or having machine-executable instructions or data structures stored thereon. Such machine-readable media can be any available media that can be accessed by a special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a special purpose computer or other machine with a processor. Machine-executable instructions include, for example, instructions and data which cause a special purpose computer or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the broad scope of the inventive concepts disclosed herein being indicated by the following claims.

What is claimed is:

1. An actuator system, comprising:
  a motor;
  a ballscrew assembly coupled to the motor;
  a no back brake device coupled to the ballscrew assembly;
  a sensor coupled to the ballscrew assembly and configured to acquire load data indicative of a load applied to the ballscrew assembly; and
  a control module coupled with the sensor, the control module including at least one processor coupled with a non-transitory processor-readable medium storing processor executable code for causing the at least one processor to:
    determine an estimated coefficient of friction for the no back brake device based on the load data; and
    transmit an alert signal based on determining that the estimated coefficient of friction is outside a predetermined range.

2. The system of claim 1, wherein the non-transitory processor-readable medium further stores processor executable code for causing the at least one processor to determine the estimated coefficient of friction based further on motor data regarding the motor.

3. The system of claim 2, wherein the motor includes an electric motor and the motor data includes an indication of a motor current.

4. The system of claim 2, wherein the motor includes a hydraulic motor and the motor data includes a pressure differential.

5. The system of claim 1, wherein the sensor includes a load pin operatively coupled to the ballscrew assembly.

6. The system of claim 1, wherein the predetermined range is defined by a minimum acceptable value for the estimated coefficient of friction for the no back brake device and wherein determining that the estimated coefficient of friction is outside the predetermined range includes determining that the estimated coefficient of friction is below the minimum acceptable value.

7. The system of claim 1, wherein the alert signal includes an indication of a potential failure of the no back brake device.

8. The system of claim 1, wherein the alert signal is configured to actuate a secondary brake.

9. A control system configured to monitor a condition of a no back brake device, comprising:
  a control module including at least one processor coupled with a non-transitory processor-readable medium storing processor executable code for causing the at least one processor to:
    receive load data from a sensor indicative of an external load applied to a ballscrew assembly coupled to a no back brake device;
    receive motor data regarding a motor coupled to the ballscrew assembly;
    determine a coefficient of friction for the no back brake device based on the load data and the motor data; and
    transmit an alert signal based on determining that the coefficient of friction is outside a predetermined range.

10. The control system of claim 9, wherein the motor includes an electric motor and the motor data includes an indication of a motor current.

11. The control system of claim 9, wherein the motor includes a hydraulic motor and the motor data includes an indication of a pressure differential.

12. The control system of claim 9, wherein the sensor includes a load pin operatively coupled to the ballscrew assembly.

13. The control system of claim 9, wherein the predetermined range is defined by a minimum acceptable value for the coefficient of friction for the no back brake device.

14. The control system of claim 9, wherein the alert signal includes an indication of a potential failure of the no back brake device.

15. The control system of claim 9, wherein the alert signal is configured to actuate a secondary brake.

16. A method of monitoring a no back brake device for an actuator, comprising:
  receiving load data from a sensor indicative of an external load applied to a ballscrew assembly coupled to a no back brake device;

receiving motor data regarding a motor coupled to the ballscrew assembly;

determining a coefficient of friction for the no back brake device based on the load data and the motor data; and transmitting an alert signal based on determining that the coefficient of friction is outside of an acceptable range.

17. The method of claim 16, wherein the motor includes an electric motor and the motor data includes an indication of a motor current.

18. The method of claim 16, wherein the motor includes a hydraulic motor and the motor data includes an indication of a pressure differential.

19. The method of claim 16, wherein the sensor includes a load pin operatively coupled to the ballscrew assembly.

20. The method of claim 16, wherein the acceptable range is defined by a minimum acceptable value for the coefficient of friction for the no back brake device.

\* \* \* \* \*